United States Patent [19]

Yamada et al.

[11] Patent Number: 5,325,311
[45] Date of Patent: Jun. 28, 1994

[54] IMAGE READING SYSTEM

[75] Inventors: Shin Yamada; Teruo Fumoto, both of Kawasaki, Japan

[73] Assignee: Matsushita Electric Industrial Co., Ltd., Osaka, Japan

[21] Appl. No.: 729,124

[22] Filed: Jul. 12, 1991

[30] Foreign Application Priority Data

Jul. 17, 1990 [JP] Japan .................. 2-188908

[51] Int. Cl.$^5$ ............................. G02B 27/64
[52] U.S. Cl. ............................ 364/525; 382/17
[58] Field of Search ............ 364/525, 526; 382/17; 358/82

[56] References Cited

U.S. PATENT DOCUMENTS

| | | | |
|---|---|---|---|
| 4,574,393 | 3/1986 | Blackwell et al. | 382/17 |
| 4,577,218 | 3/1986 | Kurata | 382/17 |
| 4,694,502 | 9/1987 | Ozawa et al. | 382/17 |
| 4,797,738 | 1/1989 | Kashi et al. | 382/17 |

FOREIGN PATENT DOCUMENTS 60-37878 2/1985 Japan .
61-274231 12/1986 Japan .

Primary Examiner—Jack B. Harvey
Assistant Examiner—Thomas Peeso
Attorney, Agent, or Firm—Lowe, Price, LeBlanc & Becker

[57] ABSTRACT

An image reading system with a light irradiating portion for irradiating light onto a predetermined range of the surface of a manuscript to be read, an image reading portion for outputting a signal obtained by first converting light reflected or transmitted by the manuscript into a luminance signal and then referring to a look-up table, an interface portion for inputting a signal from and outputting a signal to an external computing device, a manuscript scanning portion for scanning the surface of the manuscript, a central processing portion for controlling the manuscript scanning portion and a storage portion capable of storing at least one kind of density transformation curve data.

5 Claims, 8 Drawing Sheets

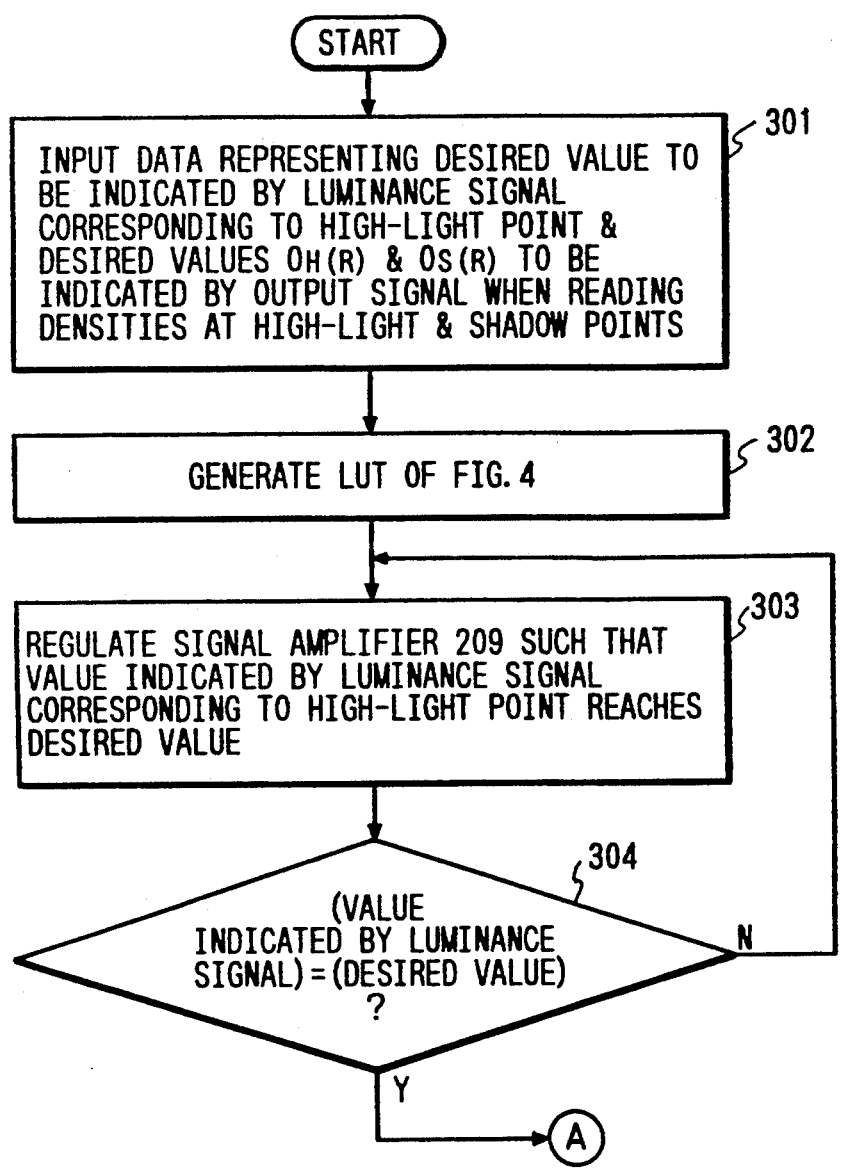

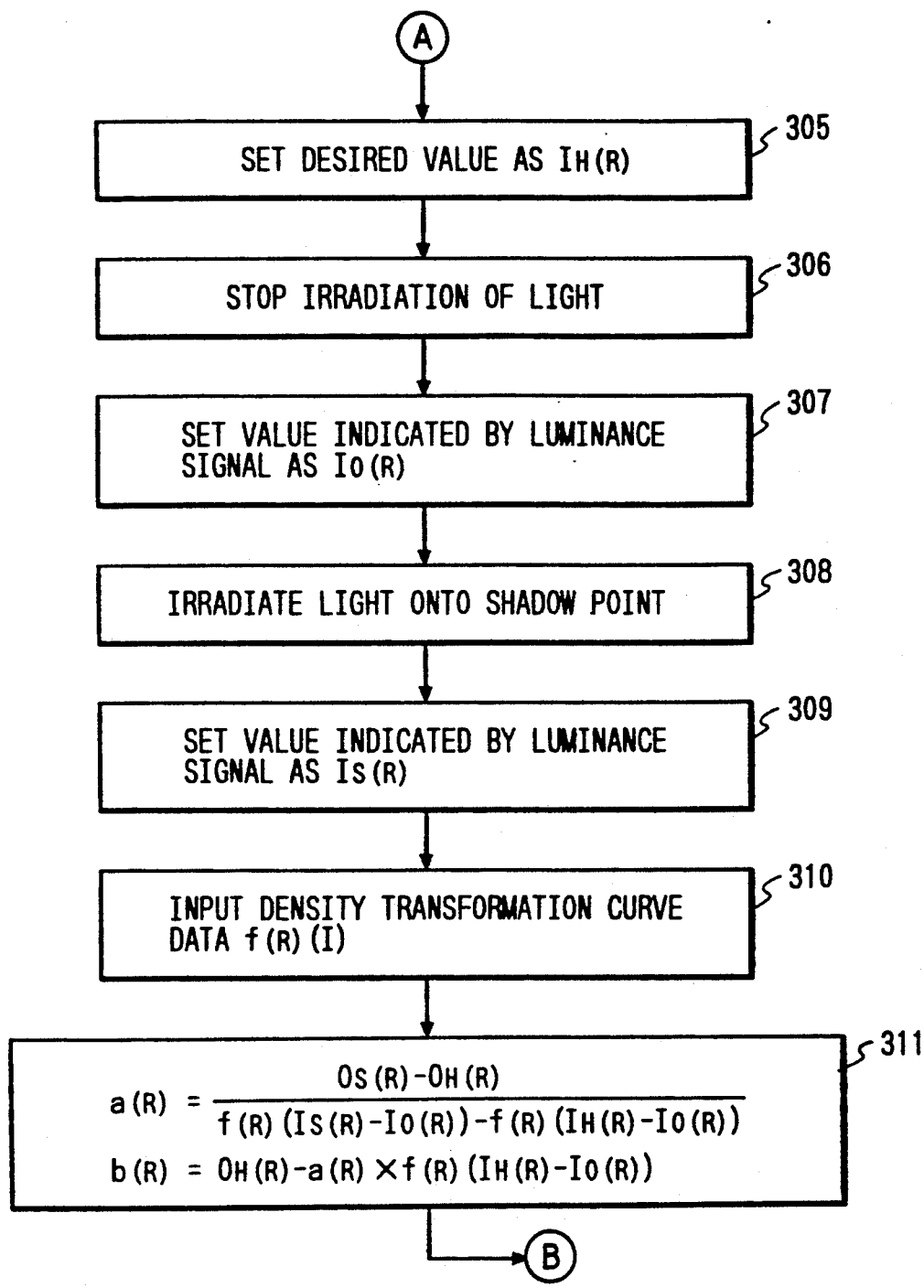

IMAGE READING SYSTEM

BACKGROUND OF THE INVENTION

1. Field of The Invention

This invention generally relates to image processing and more particularly to an image reading system for setting values indicated by signals (hereunder referred to as density signals) representing gray levels (namely, densities) at a point of a high-light portion of an original image (hereunder referred to simply as a high-light point) and a point of a shadow portion of the original image (hereunder referred to simply as a shadow point) for predetermined values and for reading a manuscript in accordance with gray scale transformation characteristics determined according to the kind of the manuscript.

2. Description of The Related Art

In a prior art image reading system, a manuscript is first irradiated by light and next a quantity of light reflected or transmitted by the manuscript (hereunder referred to as a quantity of reading-light) is measured. Subsequently, the prior art reading system generates a signal (hereunder referred to as a density signal) representing densities of the manuscript from the result of the measurement of the quantity of reading-light and outputs the generated density signal. A method of generating a density signal, which is employed by the prior art reading system, will be described hereinbelow. In case of this method, in order to freely establish a corresponding relation between quantities of reading-light and values indicated by a density signal, a quantity of reading-light is first converted into a luminance signal by a photoelectric conversion portion and a signal amplification portion of the prior art reading system and thereafter a density signal is generated by referring to a look-up table (hereunder abbreviated as an LUT).

Generally, the following three kinds of methods are employed for establishing the LUT:

(1) A first method which uses a quantity of reading-light measured when reading a gray scale chart;

(2) A second method which uses quantities of reading-light measured correspondingly to at least three points (namely, a high-light point, a point of a half-tone portion (hereunder referred to as a half-tone point) and a shadow point) of a manuscript when reading the manuscript; and (3) A third method which uses quantities of reading-light measured correspondingly to a high-light point and a shadow point of a manuscript when reading the manuscript. Further, in case where a picture is read in conformity of the range of gray levels of picture elements of the picture, the second or third method is employed. As a result of making a comparison between the second and third methods, it is found that the latter method can be performed by an operator more easily than the former method.

Additionally, the third method of establishing the LUT by using the quantities of reading-light corresponding to the high-light point and the shadow point on the manuscript has the following two types. A first type of the third method is comprised of the steps of preparing first LUT data corresponding to a positive manuscript and second LUT data corresponding to a negative manuscript, then writing the first or second LUT data to the LUT in accordance with the kind of the manuscript and subsequently regulating the signal amplification portion such that the quantities of reading-light corresponding to the high-light point and the shadow point are adjusted to operator's desired amounts.

The other type of the third method is comprised of the steps of first modifying a plurality of standard tone curve data stored in a memory such that a signal indicating data outputted from the LUT when signals representing quantities of reading-light corresponding to the high-light point and the shadow point are inputted thereto indicate desired values, then selecting the most appropriate data therefrom and subsequently writing the selected data to the LUT (see Japanese Patent Application Provisional Publication No. 60-37878 Official Gazette). In case of this type of the third method, the modification of the standard tone curve data $g_i(X)$ is performed by first obtaining parameters a and b of modified tone curve data (namely, a standard tone curve function of X-coordinates) $g_i'(X)$ by using signals inputted to the LUT respectively representing the gray level $X_{yh}$ of the high-light point having X and Y coordinates $(X_{ho}, Y_h)$ on the manuscript and that $X_{ys}$ of the shadow point having X and Y coordinates $(X_{so}, Y_s)$ thereon. The parameters a and b are defined as follows.

$$a = (X_{so} - X_{ho})/(X_{ys} - X_{yh})$$

$$b = X_{ho} - a*X_{yh}$$

Then, the modified tone curve data are obtained by the following equation.

$$g_i'(X) = g_i(a*X + b) \qquad (1)$$

Such a modification is performed on all of the standard tone curve data. Thereafter, the most appropriate data are selected and is written to the LUT.

In case where a manuscript is read by the image reading device, it is necessary to establish a reference point on the manuscript and set the system such that the difference $(O - O_H)$ between the value O indicated by a density signal corresponding to a given point on the manuscript and that $O_H$ indicated by another density signal corresponding to the reference point thereon is obtained as a linear function of the difference $(D - D_H)$ between the density D at the given point and that $D_H$ at the reference point. Hereunder, this condition will be referred to simply as a linear condition. Incidentally, in case of the third method of setting the LUT by using the quantities of reading-light corresponding to a high-light point and a shadow point, the high-light point is employed as the reference point. Further, the linear condition can be expressed as follows:

$$(D - D_H) = S_D*(O - O_H) \qquad (2)$$

where $S_D$ is a proportional factor (hereunder referred to as a density step). Furthermore, let Ds denote the density at the shadow point. In order to set the value indicated by the density signal corresponding to the shadow point as a desired value Os, the density step $S_D$ needs to be determined by the following equation:

$$S_D = (Ds - D_H)/(Os - O_H) \qquad (3)$$

Additionally, when a fixed quantity of light is irradiated on a point of a positive manuscript, the relation between a quantity L of reading-light and a corresponding density D is expressed as follows:

$$D = -\log((L-L_O)/C)$$

where C denotes a constant determined depending on the kind of the manuscript and the quantity of the irradiated light; and $L_O$ a quantity of reading-light when the fixed quantity of the light is not irradiated. Generally, the value indicated by a luminance signal I is represented by the following equation:

$$I = K \cdot L$$

where K designates a constant; L a quantity of reading-light. Therefore, $$\begin{aligned} D - D_H &= \log((L_H - L_O)/C) - \log((L - L_O)/C) \quad (4)\\ &= \log((L_H - L_O)/(L - L_O))\\ &= \log((I_H - I_O)/(I - I_O))\\ &= \log((I_H - I_O)/a)\\ &\quad - \log((I - I_O)/a) \end{aligned}$$

where $a$ is a given constant. Thus, as is understood from the equations (2) and (4), the linear condition expressed by the equation (2) holds if the relation between the value O indicated by the density signal indicating data outputted from the LUT and that I indicated by the luminance signal inputted to the LUT is given as follows:

$$O = \{\log((I_H - I_O)/a) - \log((I - I_O)/a)/S_D + O_H \quad (5)$$

Incidentally, data indicating the relation of a type as expressed by the equation (5) are referred to as gray scale transformation curve data (hereunder sometimes referred to as density transformation curve data). Furthermore, in order to make the value indicated by the density signal corresponding to the density condition equal to the desired value Os, the density step $S_D$ is determined from the equations (3) and (4) as follows:

$$S_D = \{\log((I_H - I_O)/a) - \log((I_s - I_O)/a)/(O_s - O_H) \quad (6)$$

Thus, in order to satisfy the linear condition and meet the requirement that a manuscript should be read in such a manner that the values indicated by reading-signals respectively representing the density of the high-light point and that of the shadow point become predetermined levels, it is necessary to write data satisfying the equations (5) and (6) to the LUT before the reading of the positive manuscript is started. Therefore, in order to satisfy the above described requirement, the data as given by the equation (5) (namely, the data obtained by first dividing opposite logarithmic curve data by the density step $S_D$ and next adding a constant to the result of the division) should be written to the LUT.

Further, if the difference $(O_s - O_H)$ between the desired values indicated by the reading-signals corresponding to the shadow point and the high-light point is considered to be a fixed value, the data of the LUT (hereunder sometimes referred to as the LUT data) are determined regardless of the difference $(D_s - D_H)$ between the densities at the high-light point and the shadow point in case of the prior art method of setting the LUT by writing specific data to the LUT according to the kind of the manuscript. However, as can be understood from the equation (3), the density step $S_D$ varies with the difference $(D_s - D_H)$ when the difference $(D_s - D_H)$ changes. Therefore, it can be concluded from the equation (5) that the data of the LUT for satisfying the linear condition should be changed and thus the above described requirement cannot be met by performing the prior art method.

Similarly, in case of the LUT setting method disclosed in the Japanese Patent Application Provisional Publication No. 60-37878 Official Gazette, the data of the LUT for satisfying the linear condition vary with the difference $(D_s - D_H)$ when the difference $(D_s - D_H)$ changes. Hereinafter, it is studied whether or not the system can generate data of the LUT satisfying the equation (5) such that the linear condition holds for the positive manuscript. First, let A, I and B denote the number of data inputted to the LUT, a natural number equal to or less than A and a given positive constant, respectively. Further, the following function $g_i$ (I) is employed as standard data:

$$g_i(I) = (-1) \cdot B \cdot \log(I/A)$$

In this case, the modified data $g_i$ (I) are obtained from the equation (1) as follows:

$$\begin{aligned} g_1(I) &= -B \cdot \log((\underline{a} \cdot I - \underline{b})/A)\\ &= -B \cdot \log((I - \underline{b}/\underline{a})/A)\\ &\quad -B \cdot \log(\underline{a}/A). \end{aligned}$$

Thus, there is established the following relation between the values indicated by an output signal O and an input signal representing I of the LUT generated by using the modified data:

$$O = -B \cdot \{\log((I - b/a)/A) + \log(a/A)\} \quad (7)$$

However, the constant B of the equation (7) is peculiar to the standard data $g_i(I)$ and is not necessarily equal to the density step $S_D$ which is determined according to the difference $(O_s - O_H)$ between the desired values and the difference $(D_s - D_H)$ between the densities at the shadow point and the high-light point. Thus, the data of the generated LUT do not always satisfy the equations (5) and (6). Therefore, this prior art method cannot meet the above described requirement. Moreover, even if a plurality of standard data are used, the constant B will take a plurality of values. The above described requirement cannot be met by employing this prior art method for the same reason as in case of the third method of setting the LUT.

Further, when a fixed quantity of light is irradiated on a point of a negative manuscript, the relation between a quantity L of reading-light and a corresponding density D in a positive manuscript is established as the following function:

$$D = F((L - L_O)/(L_M - L_O)) \quad (8)$$

where $L_M$ denotes a quantity of reading-light when the quantity of the irradiated light is directly read or measured. As is understood from the equations (2) and (8), the linear condition is satisfied if the density O indicated by the density signal meets the following equation:

$$O - O_H = S_D \cdot \{F((L_H - L_O)/(L_M - L_O)) - F((L - L_O)/(L_M - L_O))\} \quad (9)$$

Furthermore, as is seen from the equations (3) and (8), the density step $S_D$ should be determined by the following equations for the purpose of making the density signal corresponding to the shadow point indicate a desired value Os:

$$S_D=(O_S-O_H)/\{F((L_S-L_O)/(L_M-L_O))-F((L_H-L_O)/(L_M-L_O))\} \quad (10)$$

Hence, in cases of the conventional methods of setting the LUT, a negative manuscript cannot be read in a manner in which the above described requirement is met.

The present invention is created to solve the above described problems of the prior art system.

It is accordingly a first object of the present invention to provide an image reading system which can satisfy the linear condition and meet the requirement that a manuscript should be read in such a manner that the values indicated by reading-signals respectively representing the density of a high-light point and that of a shadow point become predetermined values.

Further, it is a second object of the present invention to provide an image reading system which can omit an operation of inputting density transformation data for frequently used manuscript from an external device and achieve the first object.

SUMMARY OF THE INVENTION

To achieve the foregoing object and in accordance with the present invention, there is provided an image reading system which comprises a light irradiating portion for irradiating light onto a predetermined range of the surface of a manuscript to be read, an image reading portion for outputting a signal obtained by first converting light reflected or transmitted by the manuscript into a luminance signal and then referring to a look-up table, an interface portion for inputting a signal from and outputting a signal to an external computing device, a manuscript scanning portion for scanning the surface of the manuscript, a central processing portion for controlling the manuscript scanning portion, the light irradiating portion, the interface portion and the image reading portion and performing operations and a storage portion capable of storing at least one kind of density transformation curve data.

Thus, in the image reading system of the present invention, first, the image reading portion is controlled such that the values indicated by the luminance signal obtained by irradiating light from the light irradiating portion onto a point on the surface of the manuscript indicated by an operator become equal to a value indicated by the operator. Then, a value $I_O$ indicated by the luminance signal obtained when light is not irradiated from the light irradiating portion, as well as values $I_H$ and Is indicated by luminance signals respectively corresponding to a high-light and shadow points indicated by the operator, onto which light is irradiated from the light irradiating portion, are determined. Subsequently, the look-up table is generated by first determining a parameter a such that the value indicated by a signal outputted from the look-up table becomes equal to a value $O_H$ indicated by the operator when the luminance signal indicating the value $I_H$ is inputted to the look-up table and that of the signal outputted from the look-up table becomes equal to another value Os indicated by the operator when the luminance signal indicating the value Is is inputted to the look-up table and by next calculating the following expression by using density transformation curve data f(I):

$$a*\{f(I-I_O)-f(I_H-I_O)\}+O_H$$

Thereby, the linear condition is satisfied. Moreover, the manuscript can be read such that the values indicated by signals corresponding to the high-light and shadow points indicate desired values.

In a predetermined embodiment of the present invention, the storage portion of this image reading system, (1) data indicating a curve which represents the following relation between data inputted to and outputted from the look-up table:

$$O=(-1)*B*\log (I/A)$$

where A, B, I and O designate the number of data inputted to the look-up table, a predetermined positive constant, a natural number inputted to the look-up table as input data and data outputted from the look-up table, respectively, and/or (2) data indicating at least a curve which represents the relation between a quantity of light transmitted by a negative manuscript and a corresponding density of a positive manuscript are stored as the density transformation curve data.

Thus, an operation of inputting density transformation curve data for frequently used manuscript from an external device can be omitted by preliminarily storing data representing the density transformation curve of frequently used manuscript in the storage portion of the image reading system of the present invention.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 3a–3d are a flowchart of a program for performing an operation of the first image reading system of FIG. 1 in case of red light;

DETAILED DESCRIPTION OF THE PREFERRED EMBODIMENTS

Hereinafter, preferred embodiments of the present invention will be described in detail by referring to the accompanying drawings.

Before describing the construction and operations of the embodiments, it will first be explained hereinbelow how the above described linear condition is satisfied in cases of the systems of the present invention.

In case of reading a positive manuscript, by indicating the following curve data as the density transformation curve data:

$$(-1) * B * \log (I/A) \tag{11}$$

output data of the LUT to be generated are obtained by the following equation which holds for input data I thereof greater than $I_O$:

$$O = a * \{\log ((I_H - I_O)/A) - \log ((I - I_O)/A)\} + O_H$$

Therefore, the linear condition expressed by the equation (5) is satisfied.

In contrast, in case of reading a negative manuscript, curve data representing the relation between a quantity of light transmitted by the negative manuscript and a corresponding density of a positive manuscript are indicated as density transformation curve data. Incidentally, the curve data are represented as follows:

$$B * F(I/A)$$

where A denotes the number of data inputted to the LUT; i a natural number equal to or less than A; B a given positive constant; and F a function used in the equation (8). Thus, output data O of the LUT are obtained by the following equation which holds for input data I thereof greater than $I_O$:

$$O = a * \{F((I - I_O)/A) - F((I_H - I_O)/A)\} + O_H$$

If the value $I_H$ indicated by a signal to be inputted to the LUT in case of reading the density of a high-light point is determined by using a densitometer such that the determined level $I_H$ satisfies the following relation:

$$(L_H - L_O)/(L_M - L_O) = (I_H - I_O)/A$$

where $L_M$ designates an amount of light when reading the irradiated light; $L_H$ a quantity of reading-light of a high-light point; and $L_O$ a quantity of reading-light, output data O of the LUT are determined as follows:

$$\begin{aligned} O &= a * \{F((I - I_O)/A) - F((I_H - I_O)/A)\} + O_H \\ &= a * \{F((L - L_O)/(L_M - L_O)) - \\ &\quad F((L_H - L_O)/(L_M - L_O))\} + O_H. \end{aligned}$$

Consequently, it can be said that the linear condition expressed by the equation (9) is satisfied.

Figure 1:
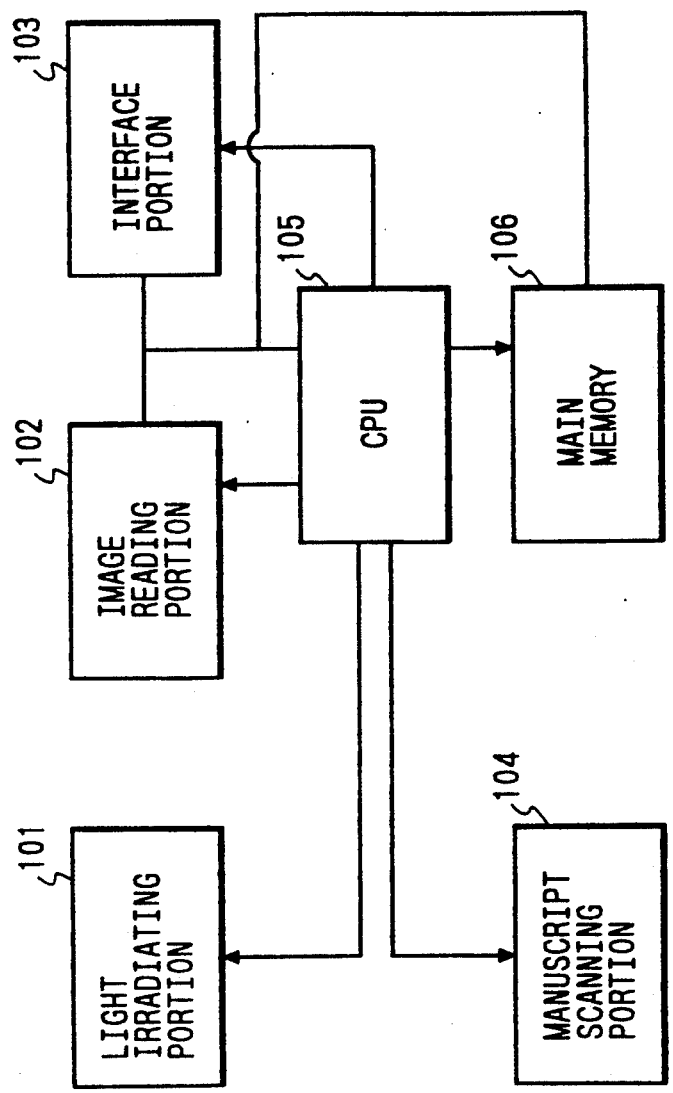
FIG. 1 is a schematic block diagram for showing the construction of a first image reading system embodying the present invention.

Hereinafter, a first embodiment of the present invention will be described. Referring first to FIG. 1, there is shown the construction of the first embodiment (namely, a first image reading system) of the present invention. In this figure, reference numeral 101 a light irradiating portion; 102 an image reading portion; 103 an interface portion; 104 a manuscript scanning portion; 105 a central processing unit (CPU); and 106 a main memory.

Figure 2:
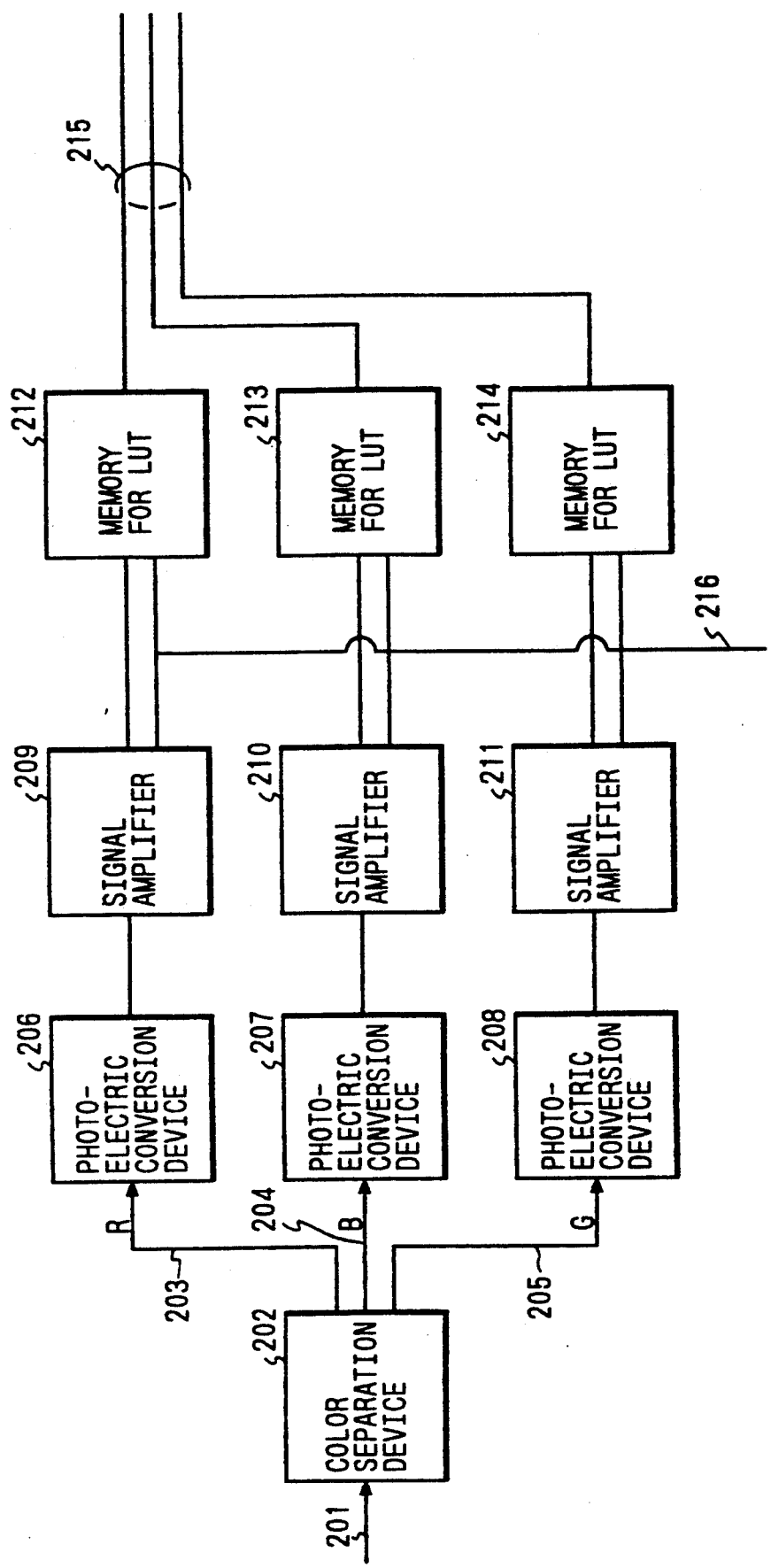
FIG. 2 is a schematic block diagram for showing the construction of an image reading portion which is a primary part of the first image reading system of FIG. 1.

Referring next to FIG. 2, there is shown the construction of an example of the image reading portion 102. In this figure, reference numeral 201 represents input light; 202 a color separation device; 203 red light separated from the input light in the color separation device; 204 blue light similarly obtained; 205 green light similarly obtained; 206, 207 and 208 photoelectric conversion devices; 209, 210 and 211 signal amplifiers; 212, 213 and 214 memories for storing the LUT; 215 signals output to the interface portion 103, the main memory 106 and the CPU 105; and 216 a signal conductor connected to the CPU 105.

Figure 3C:
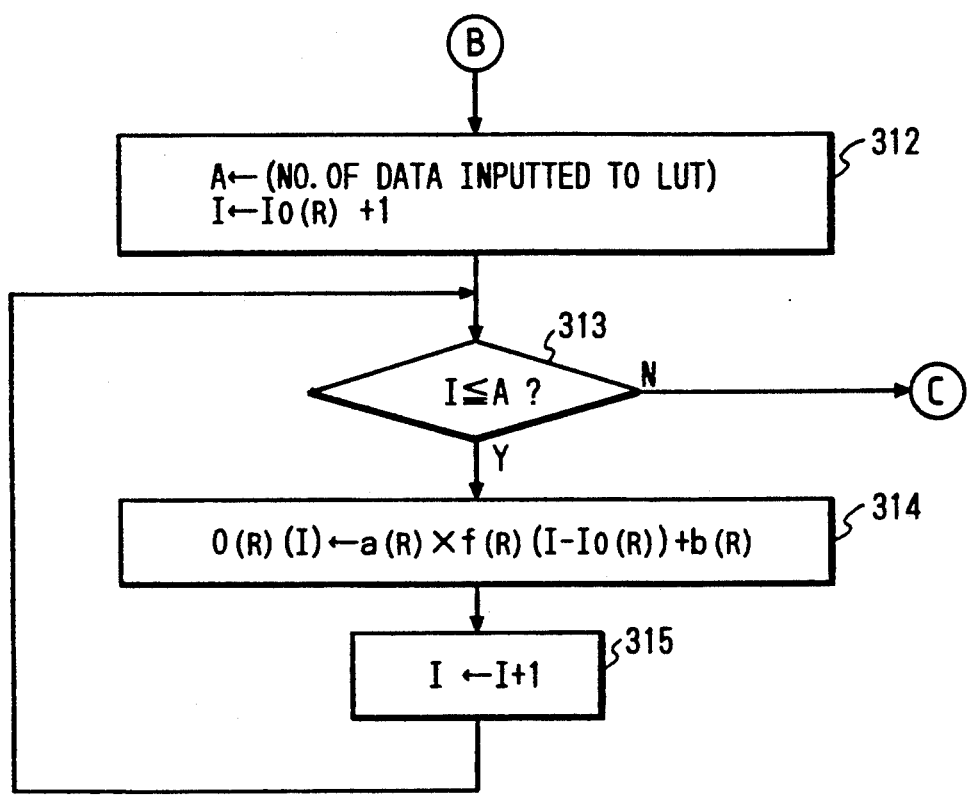
Figure 3D:
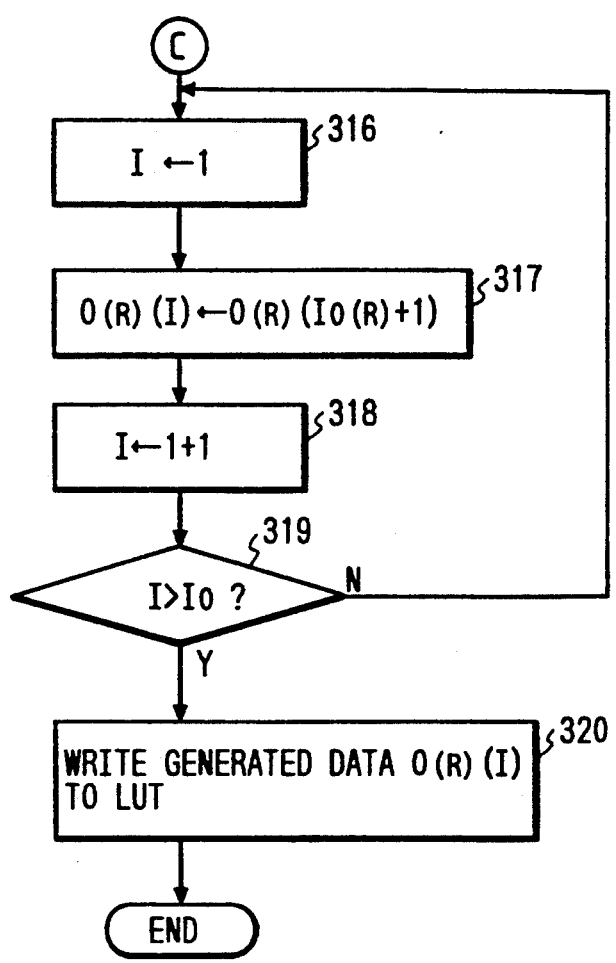

Hereinafter, an operation of the embodiment having the configuration of FIGS. 1 and 2 will be described by referring to a flowchart of a program of FIG. 3. Incidentally, this embodiment performs the same operation for the red light 203, the blue light 204 and the green light 205 obtained by separating the input light 201. In addition, note that FIG. 3 illustrates an operation of the system for the red light for simplicity of description.

First, in step 301, a desired value indicated by a luminance signal inputted to the memories 212, 213 and 214 when reading the density at a high-light point, as well as desired levels $O_{H(R)}$, $O_{H(G)}$, $O_{H(B)}$, $O_{S(R)}$, $O_{S(G)}$ and $O_{S(B)}$ of signals outputted from the memories 212, 213 and 214 when reading the densities at a high-light point and a shadow point, is inputted from the interface portion 103. Incidentally, subscripts $(R)$, $(G)$ and $(B)$ indicate that information or data indicated by reference characters below which the subscripts $(R)$, $(G)$ and $(B)$ are written relate to the red light 203, the green light 205 and the blue light 204, respectively. Further, the input data indicating the desired values are written by the CPU 105 to the main memory 106.

Figure 4:
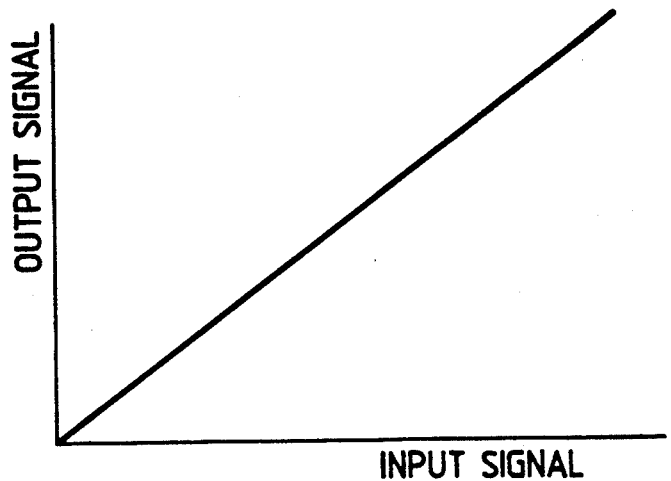
FIG. 4 is a graph for illustrating the characteristics of data of the LUT to be used in the first image reading system to find the value indicated by a luminance signal corresponding to a high-light point.

Next, the program advances to step 302 whereupon the CPU 105 writes, for example, data as illustrated in FIG. 4 to the memories 212, 213 and 214.

Thereafter, the following processing is performed in step 303. First, the CPU 105 operates the light irradiating portion 101 and the manuscript scanning portion 104 to input light, which is reflected or transmitted by the manuscript when light corresponding to the color of a high-light point indicated by an operator is irradiated, to the image reading portion 102. This input light 201 is separated into the red light 203, the green light 204 and the blue light 205, which are inputted to the photoelectric conversion devices 206, 207 and 208, respectively, by the color separation device 202. Thereafter, the system performs the same operation for each of the three colors 203, 204 and 205. Thus, the operation of the system for the red light 203 will be described hereunder for simplicity of description. Then, the light 203 separated from the input light by the color separation device 202 is converted by the photoelectric conversion device 206 into an electric signal. Subsequently, the electric signal is amplified by the signal amplifier 209. Thereafter, the amplified signal is inputted to the memory 212 for storing the LUT. Further, the CPU 105 calculates the value to be indicated by a luminance signal inputted to the memory 212 by using the value indicated by a signal outputted from the memory 212. Then, the CPU 105 compares the calculated value to be indicated by the luminance signal with a desired value which is stored in the main memory 106. Further, the offset and gain of the signal amplifier 209 are changed by the CPU 105 such that the difference between the calculated value to be indicated by the luminance signal and the desired value become decreased.

Then, in step 304, the processing of step 303 is repeatedly performed until the value indicated by the luminance signal obtained when inputting the light corresponding to the color of the high-light point to the image reading portion 101 become equal to the desired value which is stored in the main memory 106. Moreover, this value of the desired value, which is stored in the main memory 106, as data $I_{H(R)}$.

Thereafter, in step 306, the CPU 105 stops the light irradiating portion 101 from irradiating. At that time, light inputted to the image reading portion 102 is converted into a signal and subsequently the signal is outputted from the memory 212 for storing the LUT, similarly as in case of inputting the light corresponding to the color of the high-light point. Then, in step 307, the CPU 105 calculates the value to be indicated by a luminance signal to be inputted to the memory 212 on the basis of the value indicated by the signal outputted from the memory 212. Moreover, the calculated value is stored in the main memory 106 as data $I_{O(R)}$.

Furthermore, in step 308, the CPU 105 operates the light irradiating portion 101 and the manuscript scanning portion 104 to irradiate light corresponding to the color of a high-light point indicated by an operator. Then, in step 309, the value to be indicated by a luminance signal is calculated and the calculated value is stored in the main memory 106 as data $Is_{(R)}$, similarly as in step 307.

After the above described operation is completed, density conversion curve data are read from the interface portion 103. The thus read density conversion curve data are written to the main memory 106. Then, three kinds of the data of the LUT are generated and further written to the memories 212, 213 and 214, respectively. Each of the three kinds of the data of the LUT is generated by performing the same operational procedure. Therefore, only the procedure of generating data to be written to the memory 212 for storing the LUT data relating to the red light will be described hereinbelow by way of example.

First, the CPU 105 reads the data $I_{H(R)}$, $I_{S(R)}$, $I_{O(R)}$, $O_{H(R)}$ and $Os_{(R)}$ from the main memory 106.

Next, the processing of step 310 is effected. In case of reading a positive manuscript, the data represented by the equation (11) are read from the interface portion 103 and inputted to the main memory 106 as density transformation curve data $f_{(R)}$ (I). In contrast, in case of reading a negative manuscript, data B * F(I/A) represented by using a density transformation function F, the number A of data inputted to the LUT, a natural number I equal to or less than A and a given positive constant B are read from the interface portion 103 and inputted to the main memory 106 as density transformation curve data $f_{(R)}$ (I).

Further, in step 311, the following equation is calculated regardless of the kind of the manuscript:

$$a_{(R)}=(Os_{(R)}-O_{H(R)})/\{f_{(R)}(-I_{O(R)})-f_{(R)}(I_{H(R)}-I_{O(R)})\}$$

Subsequently, the following equation is calculated:

$$b_{(R)}=O_{H(R)}-a_{(R)}*f_{(R)}(I_{H(R)}-I_{O(R)})$$

Figure 5:
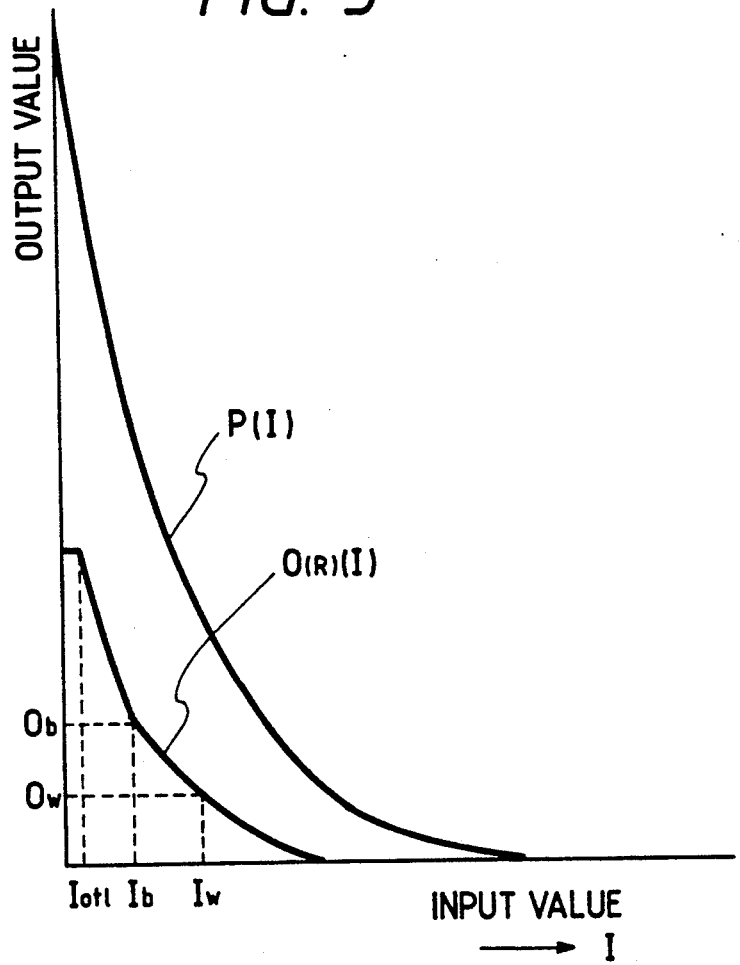
FIG. 5 is a graph for illustrating the characteristics of density transformation curve data and data of the LUT generated by using the density transformation curve data which are used in the first image reading system of FIG. 1.

Then, data generated in accordance with the following equation in steps 312, 313, 314 and 315

$$O_{(R)}(I+I_{O(R)})=a_{(R)}*f_{(R)}+b_{(R)}$$

as well as data generated in accordance with the following equation holding for $I_{O(R)}$ equal to or greater than 1 and inequality in steps 312, 313, 314 and 315

$$O_{(R)}(I)=O_{(R)}(1+I_{O(R)})$$

are written to the LUT 212 in step 320. Thereby, the data $O_{(R)}$ of the LUT 212 as illustrated in FIG. 5 are generated.

As described above, in case of this embodiment, the value to be indicated by a luminance signal obtained when light is not irradiated and those $I_H$ and Is to be indicated by luminance signals respectively corresponding to a high-light point and a shadow point are measured after the value indicated by a luminance signal corresponding to a high-light point is adjusted to a desired value. Then, for the purpose of making the values indicated by output signals of the memory storing the LUT, which correspond to the high-light point and the shadow point, equal to desired values $O_H$ and $Os$, the parameter a is first calculated as follows by using the density transformation curve data f(I):

$$a=(Os-O_H)/\{f(Is-I_O)-f(I_H-I_O)\} \tag{13}$$

Then, the parameter b is calculated in accordance with the following equation:

$$b=O_H-a*f(I_H-I_O) \tag{14}$$

Subsequently, the LUT is generated by using data O obtained in accordance with the following equation:

$$O(I+I_O)=a*f(I)+b \tag{15}$$

The above described operation of generating the LUT is performed on each of the red, green and blue components of the input light. Further, in case of reading a positive manuscript, it is found from the equations (14) and (15) and the following equations:

$$S_D=B/a$$

$$f(I)=(-1)*B*\log(I/A)$$

that the equation (5) holds. Similarly, in case of reading a negative manuscript, it is found from the equations (12), (14), (15) and the following equations:

$$a=-B$$

$$f(I)=F(I/A)$$

that the equation (9) holds. Thus, the linear condition is satisfied in case of each of the red, green and blue components of the input light. Additionally, the equations (13), (14) and (15) holds for each of the red, green and blue components of the input light. Therefore, the manuscript can be read such that the values indicated by the signals representing the densities at the high-light point and the shadow point have the desired values.

Next, a second embodiment of the present invention will be described hereinbelow.

Figure 6:
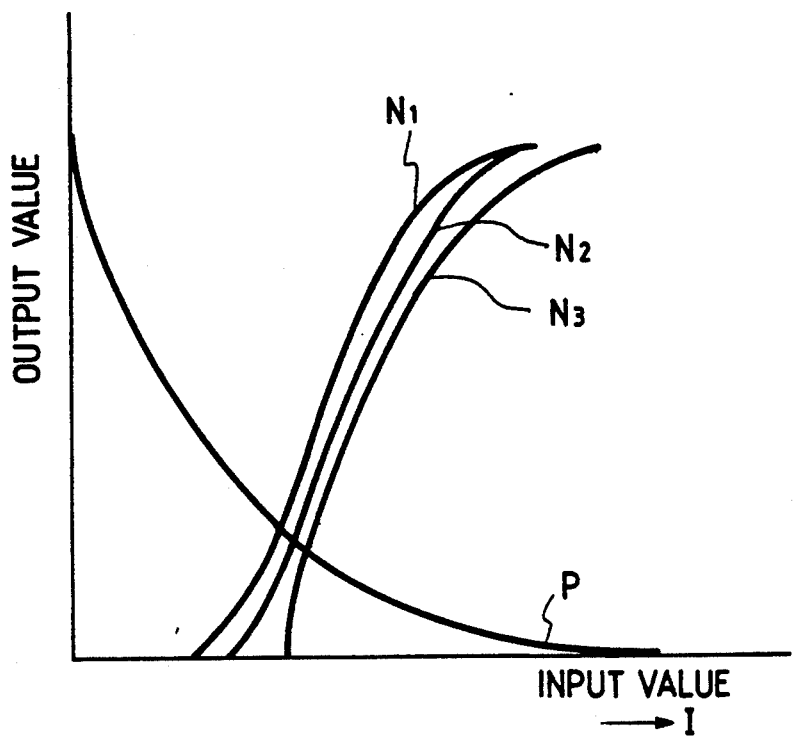
FIG. 6 is a graph for illustrating the characteristics of density transformation curve data stored in a second embodiment of the present invention.
Figure 7:
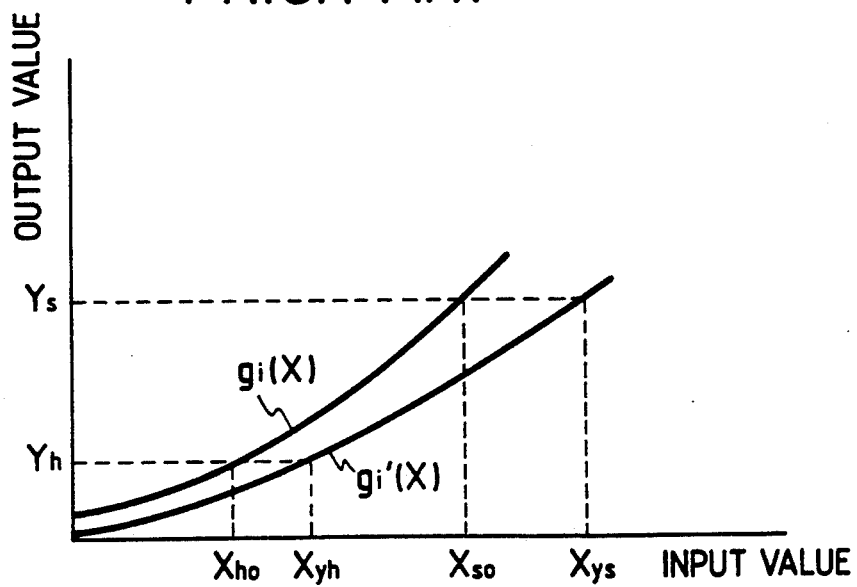
FIG. 7 is a graph for illustrating the characteristics of standard data and data obtained by modifying the standard data in case of employing the conventional method of establishing the LUT.

The second embodiment has the same construction as the first embodiment except that density transformation curve data representing frequently used density transformation curve as illustrated in FIG. 6 are written to the main memory 106. The curve P of FIG. 6 shows the following relation between an input value I and a corresponding output value P(I):

$$P(I) = (-1)^* B^* \log(I/A) \quad (16)$$

Further, the curves $N_1$, $N_2$ and $N_3$ show the following relation:

$$Ni(I) = Fi(I/A), \, i = 1,2,3 \quad (17)$$

Incidentally, in the equations (16) and (17), A denotes the number of data inputted to the LUT; I a natural number equal to or less than A; B a positive constant; and Fi a density transformation characteristic function.

An operation of the second embodiment is the same as of the first embodiment except that after three kinds of density transformation curve data read from the interface portion 103 are written to the main memory 106, one kind of the density transformation curve data stored in the main memory 106 is selected according to the kind of the manuscript and subsequently three kinds of LUT data are generated from the selected kind of the density transformation curve data instead of generating three kinds of LUT data from the three kinds of the stored density transformation curve data, respectively.

Therefore, in case of the second embodiment, an operation of inputting the density transformation curve data from an external device can be omitted.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An image reading system comprising:
a light irradiating portion for irradiating light onto a predetermined range of the surface of a manuscript to be read;
an image reading portion for outputting a signal obtained by first converting light reflected by and light transmitted through the manuscript into a luminance signal and then referring to a look-up table;
an interface portion for inputting a signal from and outputting a signal to an external computing device;
a manuscript scanning portion for scanning the surface of the manuscript;
a central processing portion for controlling the manuscript scanning portion, the light irradiating portion, the interface portion and the image reading portion and performing operations; and
a storage portion capable of storing at least one kind of density transformation curve data, wherein the image reading portion is controlled such that the value indicated by the luminance signal, which is obtained by irradiating light from the light irradiating portion onto a point on the surface of the manuscript indicated by an operator, becomes equal to a value indicated by the operator, and wherein subsequently, a value $I_o$ indicated by the luminance signal which is obtained when light is not irradiated from the light irradiating portion, as well as values $I_H$ and $I_S$ indicated by luminance signals respectively corresponding to a high-light and shadow points onto which light is irradiated from the light irradiating portion, indicated by the operator, is determined and wherein thereafter, the look-up table is generated by first determining a parameter a such that the value indicated by a signal outputted from the look-up table becomes equal to a value $O_H$ indicated by the operator when the luminance signal indicating the value $I_H$ is inputted to the look-up table and that indicated by the signal outputted from the look-up table becomes equal to another value $O_S$ indicated by the operator when the luminance signal indicating the value Is is inputted to the look-up table and by next calculating the following expression by using density transformation curve data f(I):

$$a^* \{f(I-I_o) - f(I_H - I_o)\} + O_H.$$

2. An image reading system as set forth in claim 1 wherein the storage portion stores data indicating a curve which represents the following relation between data inputted to and outputted from the look-up table:

$$O = (-1)^* B^* \log(I/A)$$

where A, B, I and O designate the number of data inputted to the look-up table, a predetermined positive constant, a natural number inputted to the look-up table as input data and data outputted from the look-up table, respectively.

3. An image reading system as set forth in claim 1 or 2 wherein the storage portion stores data indicating at least a curve which represents the relation between a quantity of light transmitted by a negative manuscript and a corresponding density of a positive manuscript are stored as the density transformation curve data.

4. An image reading system comprising:
a light irradiating portion for irradiating light onto a predetermined range of the surface of a manuscript to be read;
an image reading portion for outputting a signal obtained by first converting light reflected by and light transmitted through the manuscript into a luminance signal and then referring to a look-up table;
an interface portion for inputting a signal from and outputting a signal to an external computing device;
a manuscript scanning portion for scanning the surface of the manuscript;
a central processing portion for controlling the manuscript scanning portion, the light irradiating portion, the interface portion and the image reading portion and performing operations to satisfy a density linear condition wherein a difference between a value indicated by a density signal corresponding to a given point on the manuscript and a value indicated by another density signal corresponding to a reference point thereon is a linear function of a difference between the density at the given point and the density at the reference point; and
a storage portion capable of storing at least one kind of density transformation curve data,
wherein said central processing portion comprises programmed control means programmed for controlling said image reading portion such that the value indicated by the luminance signal, which is obtained by irradiating light from the light irradiating portion onto a point on the surface of the manuscript indicated by an operator, becomes equal to a value indicated by the operator, said programmed control means further programmed for subsequently controlling said image reading portion such that a value $I_o$ indicated by the luminance signal which is obtained when light is not irradiated from the light irradiating portion, as well as values $I_H$ and Is indicated by luminance signals respectively corresponding to high-light and shadow points onto which light is irradiated from the light irradiating portion, indicated by the operator, is determined, said programmed control means further programmed for thereafter generating the look-up table by first determining a parameter a such that the value indicated by a signal outputted from the look-up table becomes equal to a value $O_H$ indicated by the operator when the luminance signal indicating the value $I_H$ is inputted to the look-up table and such that the value indicated by the signal outputted from the look-up table becomes equal to another value $O_S$ indicated by the operator when the luminance signal indicating the value Is is inputted to the look-up table and by next calculating the following expression by using density transformation curve data f(I):

$$a*\{f(I-I_o)-f(I_H-I_o)\}+O_H.$$

5. A method for operating an image reading system to satisfy a density linear condition wherein a difference between a value indicated by a density signal corresponding to a given point on a manuscript being read and a value indicated by another density signal corresponding to a reference point thereon is a linear function of a difference between the density at the given point and the density at the reference point, wherein the image reading system includes: a light irradiating portion for irradiating light onto a predetermined range of the surface of the manuscript; an image reading portion for outputting a signal obtained by first converting light reflected by and light transmitted through the manuscript into a luminance signal and then referring to a look-up table; an interface portion for inputting a signal from and outputting a signal to an external computing device; a manuscript scanning portion for scanning the surface of the manuscript; a central processing portion programmed for controlling the manuscript scanning portion, the light irradiating portion, the interface portion and the image reading portion and performing operations; and a storage portion capable of storing at least one kind of density transformation curve data, the method comprising operating said programmed central processing portion to satisfy the density linear condition by performing the steps of:

controlling said image reading portion such that the value indicated by the luminance signal, which is obtained by irradiating light from the light irradiating portion onto a point on the surface of the manuscript indicated by an operator, becomes equal to a value indicated by the operator, subsequently controlling said image reading portion such that a value $I_o$ indicated by the luminance signal which is obtained when light is not irradiated from the light irradiating portion, as well as values $I_H$ and Is indicated by luminance signals respectively corresponding to high-light and shadow points onto which light is irradiated from the light irradiating portion, indicated by the operator, is determined, thereafter generating the look-up table by first determining a parameter a such that the value indicated by a signal outputted from the look-up table becomes equal to a value $O_H$ indicated by the operator when the luminance signal indicating the value $I_H$ is inputted to the look-up table and such that the value indicated by the signal outputted from the look-up table becomes equal to another value $O_S$ indicated by the operator when the luminance signal indicating the value Is is inputted to the look-up table and by next calculating the following expression by using density transformation curve data f(I):

$$a*\{f(I-I_o)-f(I_H-I_o)\}+O_H.$$

* * * * *